(12) United States Patent
Davies et al.

(10) Patent No.: US 6,269,203 B1
(45) Date of Patent: Jul. 31, 2001

(54) HOLOGRAPHIC OPTICAL DEVICES FOR TRANSMISSION OF OPTICAL SIGNALS

(75) Inventors: Brian M. Davies; Ray T. Chen; Jian Liu, all of Austin, TX (US)

(73) Assignee: Radiant Photonics, Austin, TX (US)

( * ) Notice: Subject to any disclaimer, the term of this patent is extended or adjusted under 35 U.S.C. 154(b) by 0 days.

(21) Appl. No.: 09/316,323

(22) Filed: May 21, 1999

Related U.S. Application Data

(60) Provisional application No. 60/124,811, filed on Mar. 17, 1999.

(51) Int. Cl.[7] .................................................... G02B 6/28
(52) U.S. Cl. ................................................................ 385/24
(58) Field of Search .................................. 385/11–13, 19, 385/33, 24, 37; 359/567, 576, 629, 634, 572; 369/103, 112.09, 112.01, 44.14, 44.37

(56) References Cited

U.S. PATENT DOCUMENTS

| | | | |
|---|---|---|---|
| 4,643,519 | 2/1987 | Bussard et al. | 350/96.19 |
| 4,773,063 | 9/1988 | Hunsperger et al. | 370/3 |
| 4,813,756 | 3/1989 | Frenkel et al. | 350/96.18 |
| 4,926,412 | 5/1990 | Jannson et al. | |

(List continued on next page.)

OTHER PUBLICATIONS

M.M. Ll and R.T. Chen, "Two–channel surface–normal wavelength division demultiplexer using substrate guided waves in conjunction with multiplexed waveguide holograms," Appl. Phys. Lett., Jan. 16, 1995, 262, 66(3).

M.M. Ll and R.T. Chen, "Five–channel surface–normal wavelength–division demultiplexer using substrate–guided waves in conjunction with a polymer–based Littrow hologram," Optics Lett., Apr. 1, 1995, 797, 20(7).

Charles C. Zhou, Ray T. Chen, Boyd V. Hunter, and Paul Dempewolf,"Axial–Graded–Index (AGRIN) Lens–Based Eight–Channel Wavelength Division Demultiplexer for Multimode Fiber–Optic Systems," IEEE Photon. Technol. Lett., Apr. 1998, 564, 10(4).

Jian Liu and Ray T. Chen, "A Two–Dimensional DualWavelength Routing Network with 1–to–10 Cascaded Fanouts," IEEE Photon. Technol. Lett., Feb. 22, 1998, 238, 10(2).

Charles C. Zhou, Zhenhai Fu, Ray T. Chen and Brian M. Davies, "Dispersion correction of surface–normal optical interconnection using two compensated holograms," Appl. Phys. Lett., Jun. 22, 1998, 72(25).

LtCol David Honey and Robert Leheny, "Steered Agile Beams Workshop Proceedings Book", Darpa: *Conference Material,* Mar. 24–25, 1999.

(List continued on next page.)

*Primary Examiner*—Akm E. Ullah
(74) *Attorney, Agent, or Firm*—Baker Botts L.L.P.

(57) ABSTRACT

The present invention relates to the transmission of optical signals, and more particularly to wavelength division multiplexers and demultiplexers for optical signals. A wavelength division multiplexer device for use in an optical transmission system comprises a light input, one or more lenses, a substrate, one or more holographic optical elements, and two or more light outputs. The light input, the substrate, and the one or more lenses direct a light beam through the device. The one or more holographic optical elements act as transmission diffraction gratings and spatially separate the input light beam into dispersed light beams. Each light output receives one of the dispersed light beams. Multiple holographic optical elements may be stacked upon one another or separated by a substrate. Additionally, the substrate may comprise edges or parts that are beveled. Finally, the elements of the present invention may be rigidly coupled to each other, without intervening air space.

40 Claims, 8 Drawing Sheets

U.S. PATENT DOCUMENTS

| | | | |
|---|---|---|---|
| 5,026,131 | | 6/1991 | Jannson et al. . |
| 5,029,967 | | 7/1991 | Livezey et al. .................... 350/96.19 |
| 5,228,103 | | 7/1993 | Chen et al. ............................. 385/14 |
| 5,278,687 | | 1/1994 | Jannson et al. ...................... 359/125 |
| 5,402,511 | | 3/1995 | Malone et al. ......................... 385/43 |
| 5,473,710 | | 12/1995 | Jaw et al. ............................... 385/14 |
| 5,493,393 | | 2/1996 | Beranek et al. ...................... 356/328 |
| 5,515,354 | * | 5/1996 | Miyake et al. ........................ 369/103 |
| 5,555,330 | | 9/1996 | Pan et al. ............................... 385/39 |
| 5,682,255 | * | 10/1997 | Friesem .................................. 359/19 |
| 5,694,230 | * | 12/1997 | Welch ...................................... 359/1 |
| 5,703,974 | | 12/1997 | Sasaki et al. ........................... 385/14 |
| 5,777,763 | | 7/1998 | Tomlinson, III ..................... 359/130 |
| 5,796,479 | | 8/1998 | Derickson et al. ................... 356/326 |
| 5,917,625 | | 6/1999 | Ogusu et al. ......................... 359/130 |
| 5,966,223 | * | 10/1999 | Friesem et al. ........................ 359/19 |
| 5,970,190 | | 10/1999 | Fu et al. ................................. 385/37 |
| 5,999,672 | | 12/1999 | Hunter et al. .......................... 385/37 |
| 6,003,222 | | 12/1999 | Barbarossa ............................. 29/600 |
| 6,005,714 | * | 12/1999 | Welch .................................... 359/13 |
| 6,169,613 | * | 1/2000 | Mitai et al. ............................. 359/33 |

OTHER PUBLICATIONS

Richardson Grating Laboratory, "Technical Note 6, Echelle Gratings", <http://www.gratinglab.com/library/techNotes/technote6.asp>, Aug. 23, 1999.

M.C. Huntley, "Diffraction Gratings"; Academic Press, pp. 40–42, 1982.

Tang et al; "Compression–Molded Three Dimensional Tapered Optical Polymeric Waveguides for Optoelectronic Packaging"; Radiant Research, Inc.: Article.

Tang et al; "Reconfigurable Electro–Optic Interconnects Using Holographic Elements"; Radiant Research, Inc.: Article.

Ciena, Fundamentals of DWDM; pamphlet.

U.S. Pending Patent application Ser. No. 09/405,472: Horwitz, et al.; "System and Method for Wavelength Division Multiplexing and Demultiplexing"; Radiant Research, Inc., Filed Sep. 24, 1999.

U.S. Pending Patent application Ser. No. 09/205,445: Tang, et al; "Compression–Molded Three–Dimensional Tapered Universal Waveguide Couplers"; Radiant Research, Inc., Filed Dec. 4, 1998.

* cited by examiner

HOLOGRAPHIC OPTICAL DEVICES FOR TRANSMISSION OF OPTICAL SIGNALS

This application claims the benefit of the earlier filed U.S. Provisional App. Ser. No. 60/124,811, filed Mar. 17, 1999, which is incorporated by reference for all purposes into this application.

GOVERNMENTAL RIGHTS

The invention was made with Government support under Contract Nos. F49620-98-C-0045 and F49620-00-C-0026 awarded by USAF, ARC, Air Force Office of Scientific Research. The Government has certain rights in the invention.

The U.S. Government has a paid-up license in this invention and the right in limited circumstances to require the patent owner to license others on reasonable terms as provided for by the terms of Contract No. DASG60-96-C-0171, awarded by BMDO/DOD under the STTR program.

BACKGROUND OF THE INVENTION

1. Field of the Invention

The present invention relates to transmission of optical signals, and more particularly to wavelength division multiplexers and demultiplexers for optical signals.

2. Description of Related Art

Telecommunications systems using optical media offer far larger information transmission capacity than traditional electrical communications media. Telecommunication systems using optical media perform the same basic functions as copper wires or coaxial cables in conveying information, but they transmit light instead of electrical signals. Optical media can carry voice, data, or video information. An optical transmission system is similar to a conventional transmission system, except that the transmitter converts electrical information signals to light signals while the receiver converts the light back into electrical signals.

The term "optical media" is used to describe a wide variety of media. For instance, optical fibers are thin, flexible strands of clear glass or plastic that can carry up to several gigabits of information per second. Optical media offer many distinct advantages over older transmission media, including larger bandwidth, small size and light weight, electromagnetic immunity, and low transmission loss. Regarding bandwidth, modem optical fibers, for instance, can have bandwidths 10 to 100 times greater than the best coaxial cables. If properly utilized, this bandwidth offers far larger transmission capacity than traditional electrical communications media. One of the proposed methods to exploit more efficiently the high potential bandwidth of optical media is by wavelength division multiplexing (WDM).

With the WDM technique, a large number of communication channels may be transmitted simultaneously over a single optical medium. Such a technique is necessary because information sent over optical fibers is usually encoded onto a single carrier, i.e., a single wavelength of light which is modulated to encode the information. Optoelectronic transmitters and receivers are therefore generally capable of transmitting and receiving only one wavelength of light, or a very narrow band of wavelengths. This causes an inefficiency in optical communications system, since optical media are generally capable of supporting a broad band of wavelengths.

Consequently, a scheme has been devised to increase the amount of information sent over one optical medium. The scheme, called wavelength division multiplexing (WDM) and demultiplexing (WDDM), uses multiple carriers (i.e., wavelengths) to enhance the transmission bandwidth of optical communications systems and sensor systems by simultaneously transmitting multiple communication channels over a single optical medium. Multiplexing requires focusing various carriers into one medium while demultiplexing requires a separation of carriers according to wavelength.

Transmission of multiple carriers is analogous to the use of multiple channels in the AM broadcast band: the carriers in an optical fiber are denoted according to wavelength, and the modulation scheme for each carrier is amplitude-modulation, either analog or digital. Systems that transmit information on multiple carriers in a single optical medium must take several limitations into account. First, optoelectronic transmitters have a single wavelength output. Second, each carrier requires a separate receiver for its detection. These two limitations result in the need, when transmitting multiple carriers over a single medium, for devices that multiplex (combine) multiple carriers at the transmitting end and demultiplex (separate) the carriers at the receiving end of an optical fiber link.

The most common implementation of the WDM (wavelength division multiplexer) is to accept light from each of several input ports, with each port coupled to accept light of predominantly one wavelength from an optical medium such as an optical fiber. The WDM then multiplexes (combines) the light from each of these several input ports into a single output port, which is usually coupled to one optical medium, such as a single optical fiber, for transmission to a remote location. In the terminology of electrical engineering, we might consider the WDM as a passive device with a plurality of input ports, and one single output port.

The WDDM (wavelength division demultiplexer) is the inverse device of the WDM described above. A WDDM accepts light of several different wavelengths from one input port and demultiplexes (divides) the light from the single source, such as an optical fiber, according to by wavelength. The WDDM routes each of the separated light beams into a different output port, each of which is usually coupled to one of several output optical fibers for transmission to an opto-electronic receiver.

In some implementations, the output optical signals from a WDDM may be coupled directly into optoelectronic receivers for conversion to electrical signals at a single location. In this case, the WDDM has some similarity to a spectrometer. In some implementations, a WDM can serve as a WDDM by reversing the direction of light through the device. Some of the embodiments presented in this disclosure are reversible, others are not.

Various physical implementations of WDMs and WDDMs have been proposed and demonstrated. These can be categorized into several types, based on the physical mechanisms used therein. These mechanisms include interference filters, waveguides, and holographic diffraction gratings. Various aspects of these categories are described in the following publications, each of which is incorporated herein by reference:

Maggie M. Li and Ray T. Chen, "Two-channel surface-normal wavelength division demultiplexer using substrate guided waves in conjunction with multiplexed waveguide holograms," App. Phys. Lett. 66(3), 262(Jan. 16, 1995);

Maggie M. Li and Ray T. Chen, "Five-channel surface-normal wavelength-division demultiplexer using substrate-guided waves in conjunction with a polymer-based Littrow hologram," Optics Lett. 20(7), 797(Apr. 1, 1995);

Charles C Zhou, Ray T. Chen, Boyd V. Hunter, and Paul Dempewolf, "Axial-Graded-Index (AGRIN) Lens-Based Eight-Channel Wavelength Division Demultiplexer for Multimode Fiber-Optic Systems," IEEE Photon. Technol. Lett. 10(4) 564(Apr. 4, 1998);

Jian Liu and Ray T. Chen, "A Planarized Two-Dimensional Multi-Wavelength Routing Network with 1-to-many Cascaded Fanouts," White Paper, 1998.

Jian Liu and Ray T. Chen, "Two-Dimensional Dual-Wavelength Routing Network with 1-to-10 Cascaded Fanouts," IEEE Photo. Technol. Lett. 10(2), 238(1998); and Charles C. Zhou, Zhenhai Fu, Ray T. Chen, and Brian M. Davies, "Dispersion correction of surface-normal optical interconnection using two compensated holograms," Apl. Phys. Lett. 72(25), 3249(Jun. 22, 1998).

Each category of WDDM is discussed separately below. (For ease of discussion, only WDDMs are discussed, although reversing the light path through the device results in wavelength division multiplexing for reversible methodologies.)

A relatively inexpensive type of WDDM is based on interference filters that select out a particular narrow band of wavelengths for transmission to an output port, thus selecting a single carrier. By using these interference filters at the output of a splitter, one may construct a WDDM. This implementation is not very efficient because much of the input light is lost unless the reflected light is sent to other output ports. These interference-based devices may be inexpensive, but suffer significant loss, and are essentially unrelated to the technique of the invention presented in this disclosure.

Using a different physical mechanism, one may also fashion WDDM devices based on optical waveguide techniques. Some of these are only applicable for a device with a small number of channels (2 or 3). However, the use of Fiber Bragg gratings in conjunction with directional couplers allows such devices to support more channels. The Fiber Bragg WDDM devices are currently the most efficient and provide the best performance, but are very expensive and are used only in very-long distance telecommunications applications such as undersea cables and cross-country links. Arrayed waveguide gratings are another highly efficient technology, but are also very expensive.

Closer to the physics of the present invention are devices based on diffraction gratings. WDDMs that use holographic gratings do exhibit high performance, but are difficult to manufacture and require high alignment tolerance. The physical concepts associated with WDDMs that utilize reflection gratings are nonetheless useful in understanding the concepts presented in this application. For instance, U.S. Pat. No. 4,926,412, entitled "High Channel Density wavelength Division Multiplexer with Defined Diffracting Means Positioning" which is incorporated herein by reference, discloses a dual-function simple lens to both collimate light from the end of a single optical fiber and also focus the diffracted light returned from a reflection diffraction grating, utilized in the Littrow geometry. Jannson '412 discloses at col. 3, lines 15–18 a desire to "maintain the relative positioning and alignment of the fiber optics, lens, and dispersion grating along optical axis." Jannson '412 presents a "compact, rugged" housing to maintain such positioning. This approach, however, leaves air space between the components and therefore still allows for misalignment due to outside agitation. Merely utilizing a rigid housing is therefore not sufficient to guard against misalignment over the life of the device.

U.S. Pat. No. 5,026,131 issued to Jannson et al. and entitled "High Channel Density, Broad Bandwidth Wavelength Division Multiplexer with Highly Non-Uniform Bragg-Littrow Holographic Grating," incorporated herein by reference, utilizes a diffraction grating with transmission capabilities similar to those of the present invention. Jannson '131, a continuation-in-part of Jannson '412, discloses a holographically-produced diffraction grating that both reflects and transmits diffracted light beams, rather than the reflection grating disclosed in Jannson '412. In addition to focusing reflected light beams back towards the source, the device disclosed in Jannson '131 focuses transmitted light beams to an array of fibers on the side of the grating opposite to that of the input fiber. This implementation suffers from sensitivity to misalignment, may be difficult to manufacture and package, and may suffer from low efficiency unless manufactured with high precision equipment. In addition, this implementation possesses significant air space between the elements within the housing and is therefore also subject to misalignment due to agitation from outside sources.

A U.S. patent that attempts to address vulnerability to vibration, thermal effects, and lack of rigidity is U.S. Pat. No. 5,682,255 issued to Friesem, et al, which is incorporated herein by reference. Friesem '255 incorporates a light-transmissive substrate as an essential part of the mechanical design of the WDDM. Friesem '255 accomplishes diffraction and redirection of light by using volume phase holographic transmission diffraction gratings that are bonded onto the rigid substrate. Friesem '255 does not provide a practical embodiment for a WDDM, however, because it embodies an impractical means of collimating light beams. The holograms disclosed in Friesem '255 accept both plane and spherical waves and theoretically perform the collimating function of the lens(es) disclosed in Jansson '131 and Jannson '412. While it is possible according to the theory of holograms to use a volume phase hologram to both to collimate and/or focus light while diffracting the light, such a scheme is difficult and impractical to implement. What is needed is a relatively rigid WD(D)M that uses practical, non-holographic elements to collimate and/or focus light.

SUMMARY OF THE INVENTION

The present invention relates to the transmission of optical signals, and more particularly to wavelength division multiplexers and demultiplexers for optical signals. One embodiment of the present invention comprises a wavelength division multiplexer device that includes a light input, a first lens, a holographic optical element, a light-transmissive substrate, a second lens, and two or more light outputs. The light input directs the input light beam toward the first lens, which in turn directs the input light beam towards the holographic optical element. The holographic optical element acts as a transmission diffraction grating and spatially separates the input light beam into two or more dispersed light beams. The light-transmissive substrate receives the dispersed light beams from the holographic optical element, and directs the beams to the second lens. Each light output receives one of the dispersed light beams from the second lens. Additionally, the substrate of the present invention further comprises a first edge and a second edge opposed to the first edge. The second edge comprises a beveled portion, which couples to a reflective surface. Moreover, the substrate further comprises a top part and a bottom part where the top part and the bottom part each comprise a first edge and a second edge. The second edge of the top part comprises a beveled portion, and the first edge of the bottom part comprises a beveled portion. The holographic optical element is disposed between the top part and the bottom part. Additionally, the elements of the present invention may be rigidly coupled to each other, without intervening air space, such that the light input is directly coupled to the first lens, the first lens is directly coupled to the holographic optical element, the holographic optical element is directly coupled to the substrate, the substrate is directly coupled to the second lens, and the light outputs are directly coupled to the second lens. Moreover, the elements of the present invention may be rigidly coupled to each other, without intervening air space, such that the light input is directly coupled to the first lens, the first lens is directly coupled to the top part of the substrate, the top part of the substrate is directly coupled to the holographic optical element, the holographic optical element is directly coupled to the bottom part of the substrate, the bottom part of the substrate is directly coupled to the second lens, and the second lens is directly coupled to the light outputs. Additionally, the second lens may be formed as an integral portion of the substrate. Finally, the holographic optical element further comprises two or more holographic optical elements that act as transmission gratings where the two or more holographic optical elements are stacked upon one another.

Another embodiment of the present invention comprises a wavelength division multiplexer device for use in an optical transmission system that includes a light input, a first lens, a light transmissive substrate, a holographic optical element, a second lens, and two or more light outputs. The light input directs an input light beams toward the first lens, which directs the input light beam toward a light-transmissive substrate. The holographic optical element receives the input light beam from the substrate, acting as a transmission diffraction grating, and spatially separates the input light beam into two or more dispersed light beams. The second lens receives the dispersed light beams from the holographic optical element. Each of the two or more light outputs receives one of the dispersed light beams from the second lens. Additionally, the substrate further comprises a first edge and a second edge opposed to the first edge. The second edge comprises a beveled portion where the beveled portion is coupled to a reflective surface. Additionally, the elements may be rigidly coupled to each other, without intervening air space, such that the light input is directly coupled to the first lens, the first lens is directly coupled to the substrate, the substrate is directly coupled to the holographic optical element, the holographic optical element is directly coupled to the second lens, and the second lens is directly coupled to the light outputs.

And another embodiment of the present invention comprises a wavelength division multiplexer device for use in an optical transmission system that includes a light input, a first lens, a first holographic optical element, a transparent substrate, a second holographic optical element, a plurality of output lenses, and two or more light outputs. The light input directs an input light beam toward a first lens, which directs the input light beam toward a first holographic optical element. The first holographic optical element acts as a transmission diffraction grating and spatially separates the input light beam into two or more dispersed light beams. The transparent substrate receives the dispersed light beams from the holographic optical element and directs the beams to the second holographic optical element, which diffracts the dispersed light beams. The plurality of output lenses receive the dispersed light beams from the second holographic optical element. Finally, each light output receives one of the dispersed light beams from the plurality of output lenses.

DETAILED DESCRIPTION OF THE INVENTION

The present invention comprises a method and apparatus for transmitting optical signals. This disclosure describes numerous specific details that include specific structures, in order to provide a thorough understanding of the present invention. One skilled in the art will appreciate that one may practice the present invention without these specific details. Additionally, this disclosure does not describe in detail some well-known structures and mechanisms, such as fiber Bragg gratings and their physical operation, in order not to obscure the present invention.

The present invention relates to a method and apparatus of transmitting optical signals, and more particularly to wavelength division multiplexers and demultiplexers for optical signals. The basic requirement of a WDDM is to disperse several wavelengths of light from a source such as an optical fiber into spatially distinct beams. The WDDM must provide adequate spatial separation of the dispersed beams to allow the coupling of each distinct beam into an optical medium while at the same time ensuring minimal loss of intensity in each dispersed beam.

The devices of the present invention are intended primarily for application to telecommunications or to data communications networks operating at channel bit rates of several hundred megabits to several gigabits per second (100's of Mbits/s to several Gbits/s), operating in a digital mode. However, they would also be useful to analog cable television systems, some types of sensors systems based on optical fiber detectors or signal-distribution by fibers, and to local area networks between computers and within large multi-processor computers (supercomputers).

Figure 1:
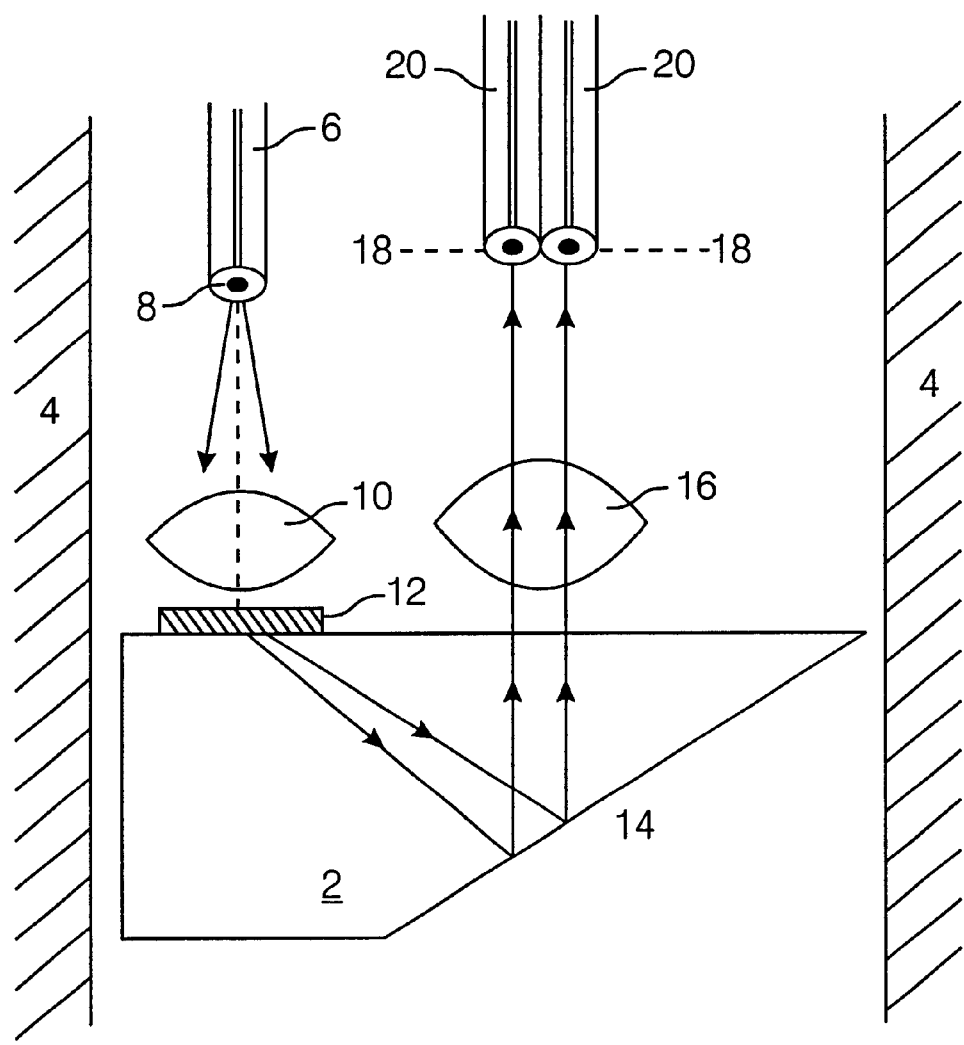
FIG. 1 illustrates a WDDM utilizing a lens as the input coupler, one grating for dispersion, an internal reflection in the transparent substrate, and a single lens as the output coupler.
Figure 3:
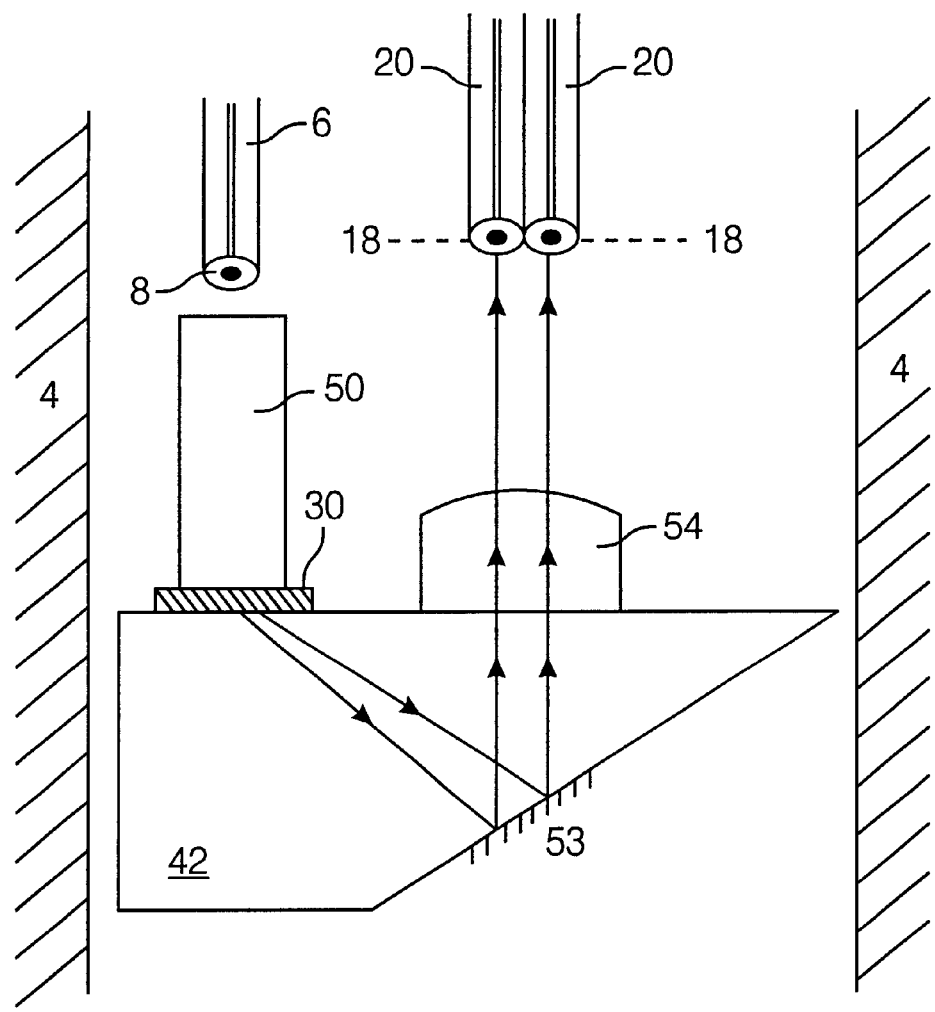
FIG. 3 illustrates a WDDM with a substrate having a beveled surface for one internal reflection, with a cylindrical lens collimator, one dispersive element, and a cylindrical lens output focuser.
Figure 4:
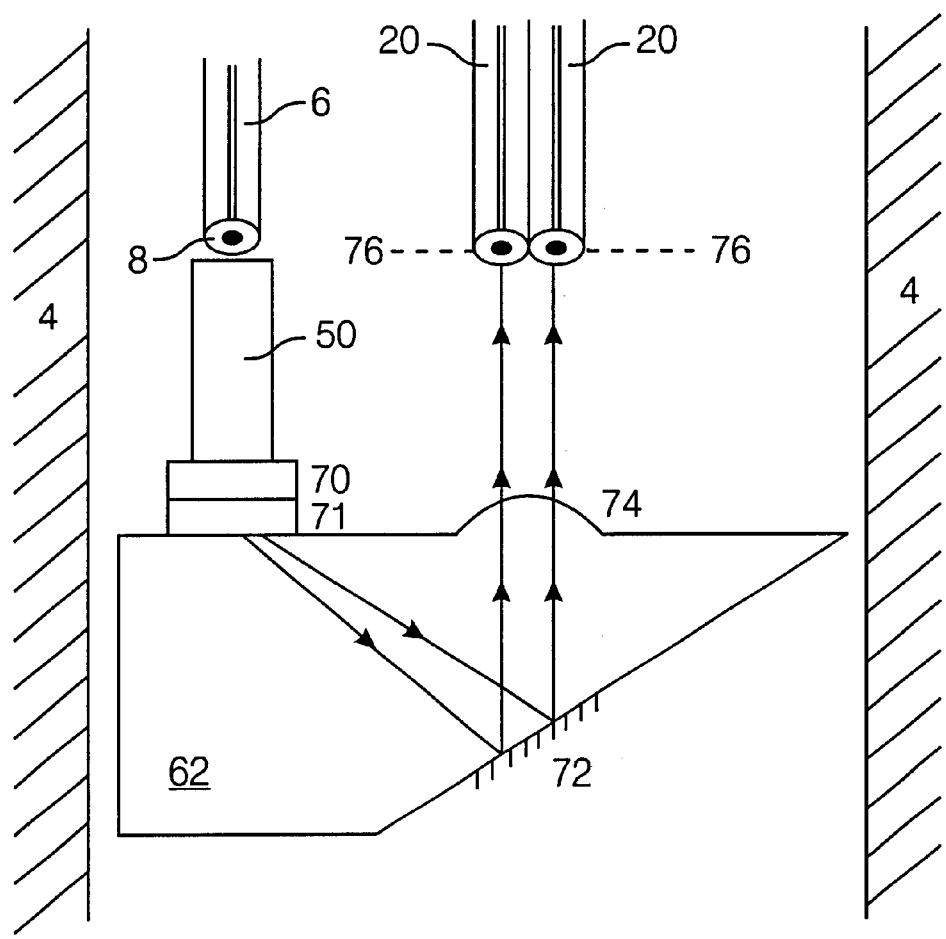
FIG. 4 illustrates a WDDM similar to that of FIG. 1, but with a cylindrical lens for collimation, two stacked holographic gratings for enhancement of the dispersion, and a molded curved substrate surface which acts as an output coupler lens.

FIGS. 1, 3, and 4 illustrate embodiments of the present invention that provide spatial separation of beams through the use of holographically-recorded diffraction gratings 12, 70, 71, 52 that act as transmission gratings. The present invention allows these dispersed beams to propagate and separate entirely within a transparent substrate 2, 42, 62. The transparent substrate 2, 42, 62 prevents free-space propagation of the dispersed beams and therefore minimizes the resultant susceptibility to misalignment due to shock, vibration, and thermal effects.

FIGS. 1, 3, and 4 illustrate that a novel feature of the transparent substrate 2, 42, 62 of some embodiments of the present invention is the use of folded geometry. Such geometry allows the dispersed beams to propagate within a relatively narrow area of the substrate, and also allows the initial light source and the dispersed beams to enter and exit from the same surface of the transparent substrate. The folded geometry allows for a more compact WD(D)M. Such folding geometry also allows the WD(D)M more practical efficiency, since both the incoming and outgoing mechanisms may be placed on the same surface of the WD(D)M units. This allows for stacking and shelving multiple units such that only one surface need be exposed and accessible.

FIGS. 1, 3, and 4 illustrate that the folded geometry is accomplished in the following manner. The dispersed light beams from the transmission gratings 12, 52, 70, 71 enter a first edge of the substrate 2, 42, 62. The dispersed beams travel through the substrate toward a second edge of the substrate. The second edge is opposed to the first edge, and the particular portion of the second edge involved in the folding process is beveled. FIGS. 1, 3, and 4 illustrate that a reflective surface 14, 53, 72 is coupled to the beveled portion of the second edge. The angle of the bevel, along with the reflective surface 14, 53, 72 result in directing the dispersed light beams back toward the first edge of the substrate. The light beams escape from the substrate 2, 42, 62 at a surface normal angle.

FIGS. 1 through 7 illustrate that the present invention utilizes surface-normal geometry for entry and exit of light beams into and out of the WD(D)M device. This allows efficient coupling to optical elements. FIGS. 1 through 7 further illustrate that the present invention additionally utilizes refracting elements such as lenses or integral curved portions of the substrate in order to efficiently couple the light from an optical medium (i.e., optical fiber, photodiode array, or array of vertical -cavity surface-emitting lasers (VCSELs)) into or out of the substrate. For instance, FIG. 1 illustrates that the input light beam from a source 8 is collimated with the use of a first lens 10 onto the transmission grating 12. As another example, FIG. 4 illustrates an embodiment of the present invention wherein the refracting element is a cylindrical lens 68 that is directly mounted to the stack of transmission gratings 70, 71. The cylindrical lens 68 collimates the input light beam from the source 66, which is input at the surface normal angle. Likewise, FIG. 3 illustrates the use of a cylindrical lens 50 to collimate the light from a source 48 onto a single transmission grating 52. Again, the source 48 inputs a light beam into the WD(D)M at a surface normal angle.

Referring to FIG. 1, a preferred embodiment utilizes a transparent substrate 2 enclosed in a housing 4 which also contains other components. An input light beam enters the device through an optical fiber 6 which may be contained in a sleeve or jacket 8. At the end of the optical fiber 6, the input light beam is emitted in a conical beam and is incident on a first lens 10, which collimates the light into a beam having a diameter which depends on the focal length f of the lens and on the numerical aperture (N.A.) of the optical fiber 6. This collimated beam is then incident on a holographic optical element 12 (HOE) which has been formed or coupled on the surface of the substrate 2. This holographic element 12 acts as a transmission diffraction grating, and diffracts the beam of light into several dispersed light beams, which travel in slightly different directions depending on their wavelength. These dispersed beams may be traveling in such a direction in the light-transmissive substrate that it is necessary to alter their direction before they can exit the first edge of substrate (otherwise they may be trapped inside the substrate by multiple total internal reflections). FIG. 1 illustrates that a beveled portion 14 of the second edge is used to alter the direction of the beams inside the substrate in this embodiment. The beveled portion 14 must be coated with a reflective metal such as aluminum or gold in order to be highly reflective. The angle of the beveled portion 14 is designed so that the beam now exits the opposing surface of the substrate at approximately a right angle. Note, however, that the angular deviation of each beam with respect to the others is altered only slightly by the exiting surface, and that the beams are not parallel to each other. Above the first edge of the substrate is placed a second lens 16, which focuses the beams of light onto a focal plane 18. This focal plane 18 may contain a series of receiving elements such as photodiodes or other light receptors in order to convert the dispersed light beams into an electrical signal, or alternatively, as shown in FIG. 1, the focal plane may contain the ends of a bundle 20 of optical fibers. The light from each beam enters the optical fiber through its polished end, and is thus transmitted out of the device to another location.

Figure 2:
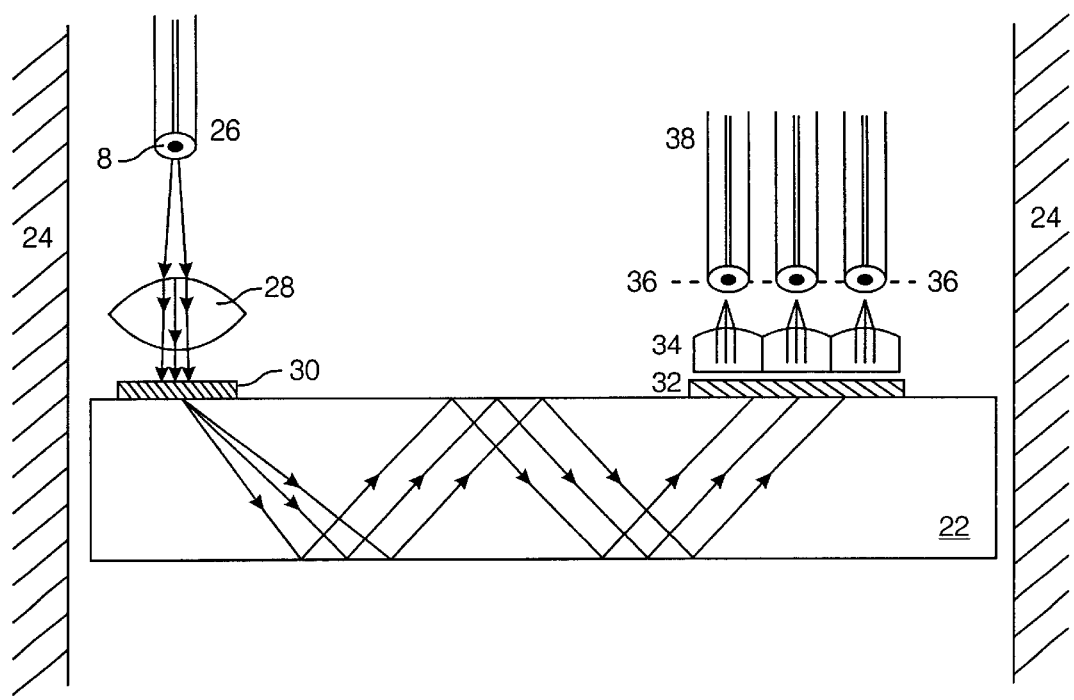
FIG. 2 illustrates a WDDM utilizing a lens for the input coupler and a lens array for the output coupler, with two gratings for dispersion and compensation purposes, and with multiple substrate reflections.

An alternative embodiment, shown in FIG. 2, utilizes a transparent substrate 22 enclosed in a housing 24 which also contains other components. An input light beam enters the device through the optical fiber 26 and is collimated by a first lens 28, and then is diffracted by a first holographic optical element 30 in the same manner as in the embodiment shown in FIG. 1. Unlike the previous embodiment, however, these dispersed beams are now guided inside the substrate 22 by multiple total internal reflections from the second edge and/or first edge of the substrate until the beams are separated an adequate amount, depending on the designed wavelength separation of the device. After several of these reflections, the light enters a second holographic optical element HOE 32 on the surface of the substrate 22. This second HOE 32 is designed to be complementary to the first HOE 30 so that a particular beam of light is diffracted up at a right angle to the substrate 22. These dispersed beams now exit the first edge (i.e., top surface) of the second HOE 32 at a right angle. Above the exiting edge of the substrate 22 is placed a plurality, or array, of output lenses 34, which focuses the individual dispersed beams of light onto an effective focal plane 36. An array of output lenses is required in this embodiment instead of a single lens as in FIG. 1, since each of the separated beams is parallel to each other, and a single lens would bring these parallel beams to a single focal point, which would defeat the purpose of the device. Instead, the array of output lenses 34 focuses each of the dispersed beams to the focal point on the optical axis of that individual lens 34a, 34b, 34c, and thus accomplishes the separation of the various wavelengths of light. Since each of the lenses 34a, 34b, 34c in the array is designed to have the same focal length, the aggregate of these focal points fall on a single plane (this might be confused with the focal plane of a single lens, but the modality of the focusing effect is quite distinct). This effective focal plane 36 may contain a series of receiving elements as in the previous embodiment, or may contain the ends of a bundle 38 of optical fibers. The light from each beam enters the optical fiber through its polished end, and is thus transmitted out of the device as before.

In a third embodiment, as shown in FIG. 3, the first lens (i.e., the input lens) and the second lens (i.e., the output focusing lens) are replaced by lenses 50, 54 that have a cylindrical shape. This has the advantage of allowing the elimination of free space in the design, which makes the device more robust. In the FIG. 3 embodiment, the cylindrical output focusing lens 54 also serves to make the structure more rigid, since it can be bonded directly to the substrate 42. FIG. 3 illustrates that the WDDM of the third embodiment also utilizes the folded geometry discussed above.

In a fourth embodiment, shown in FIG. 4, the input holographic optical element is composed of two (or more) HOEs 70, 71 stacked one on top of the other. This multiple diffractive element is designed so that the dispersion of light is greater than for a single element, and functions by first dispersing the light in the topmost grating 70, and then dispersing the light again in the second grating 71 situated directly below the first. This is necessary for designs which require higher resolution, but comes at the cost of greater complexity in the recording of the stacked HOEs. This embodiment also illustrates the use of a curved surface 74 which is molded onto the surface of the substrate 62, for the purpose of providing focusing of the output light beams into the focal plane 76. Generally speaking, this is not the preferred type of output focusing element, but it may be produced more cheaply by molding the entire substrate from a transparent polymer with the second lens formed as an integral portion of the substrate, rather than using polished glass. FIG. 4 illustrates that this fourth embodiment also uses a beveled edge coated with a mirror surface 72, in order to achieve the folded geometry discussed above.

Figure 5:
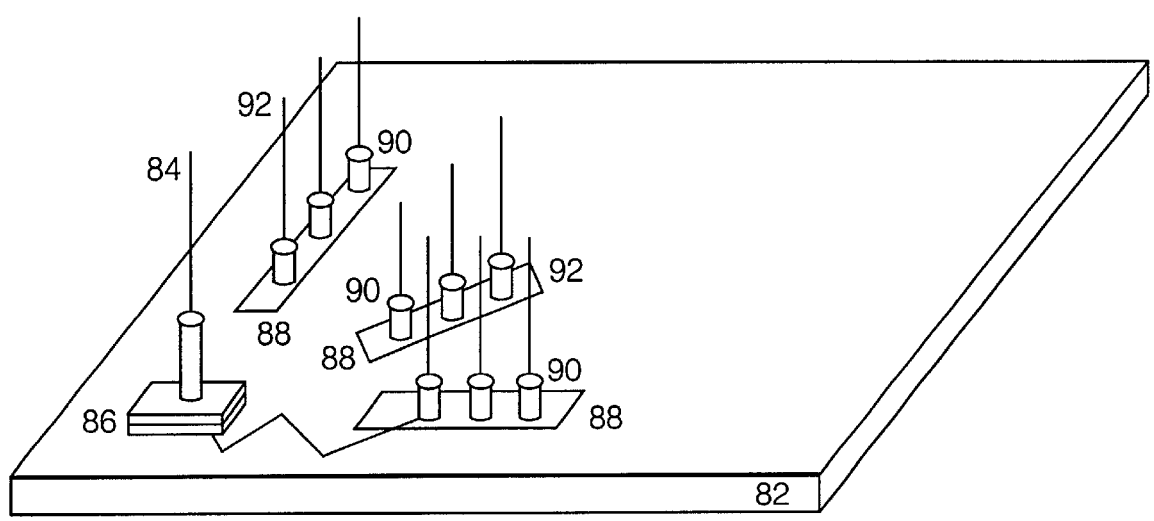
FIG. 5 illustrates a three-dimensional device with 3 WDDMs, each similar to that of FIG. 2, but with an input holographic element composed of either multiplexed or stacked holograms.

In a fifth embodiment, shown in FIG. 5, several of the input HOEs of the previous embodiment are recorded one on top of the other 86 on a substrate 82 so that the light is dispersed into two or more different planes (each containing the input optical axis). Superficially, this stack of holographic elements 86 appears to be the same as the previous stacked holograms 70, 71 of FIG. 4, but the function is different. Each HOE in the FIG. 5 stack 86 is recorded so that it has high diffraction efficiency for one particular wavelength, and that particular wavelength of light is diffracted in a direction with an azimuthal angular separation from the other beams. This embodiment requires a substrate 82 which has sufficient volume to accommodate the various diffracted beams as they propagate in the substrate 82 by multiple bounces. After each beam has propagated a sufficient distance, an output coupling hologram 88 is used as in FIG. 2 in order to couple the light out of the substrate, through a lens 90, and into an optical fiber 92 or detector (not shown).

Figure 6:
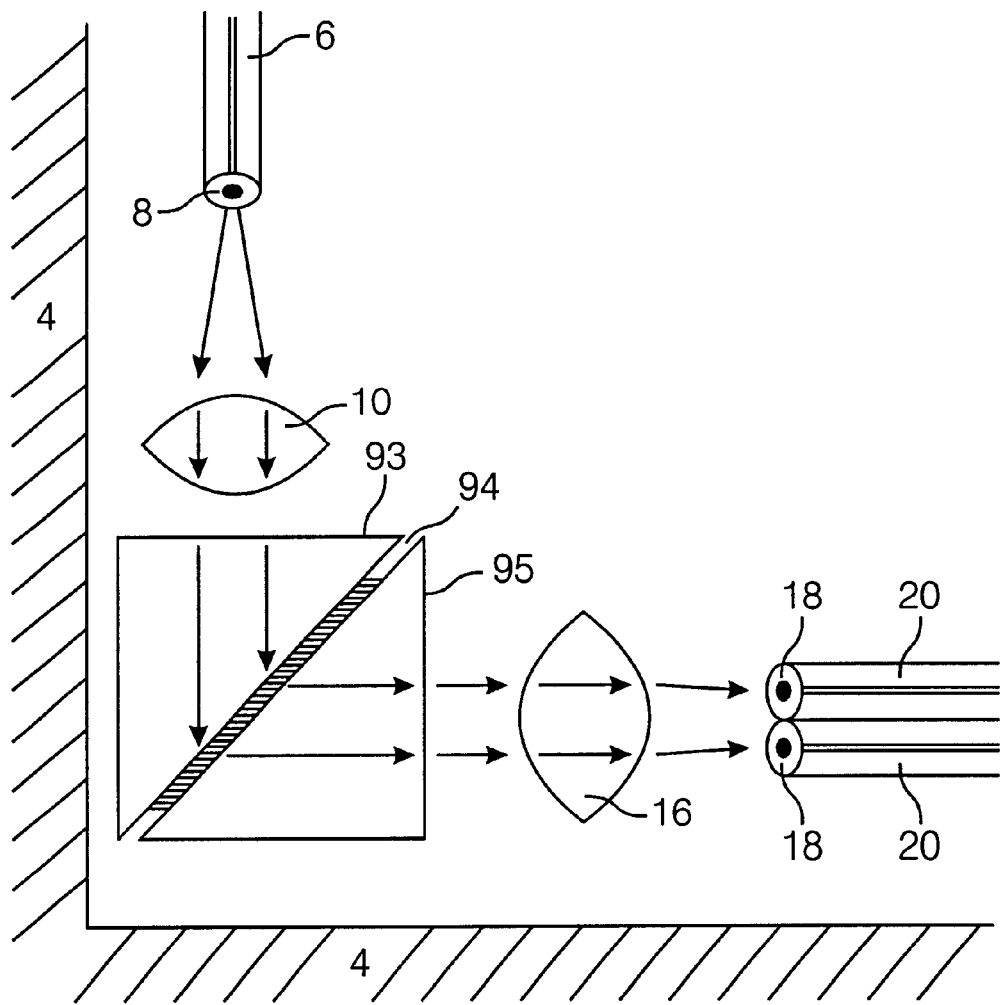
FIG. 6 illustrates a WDDM wherein the holographic element is coupled between two substrate prisms.
Figure 6A:
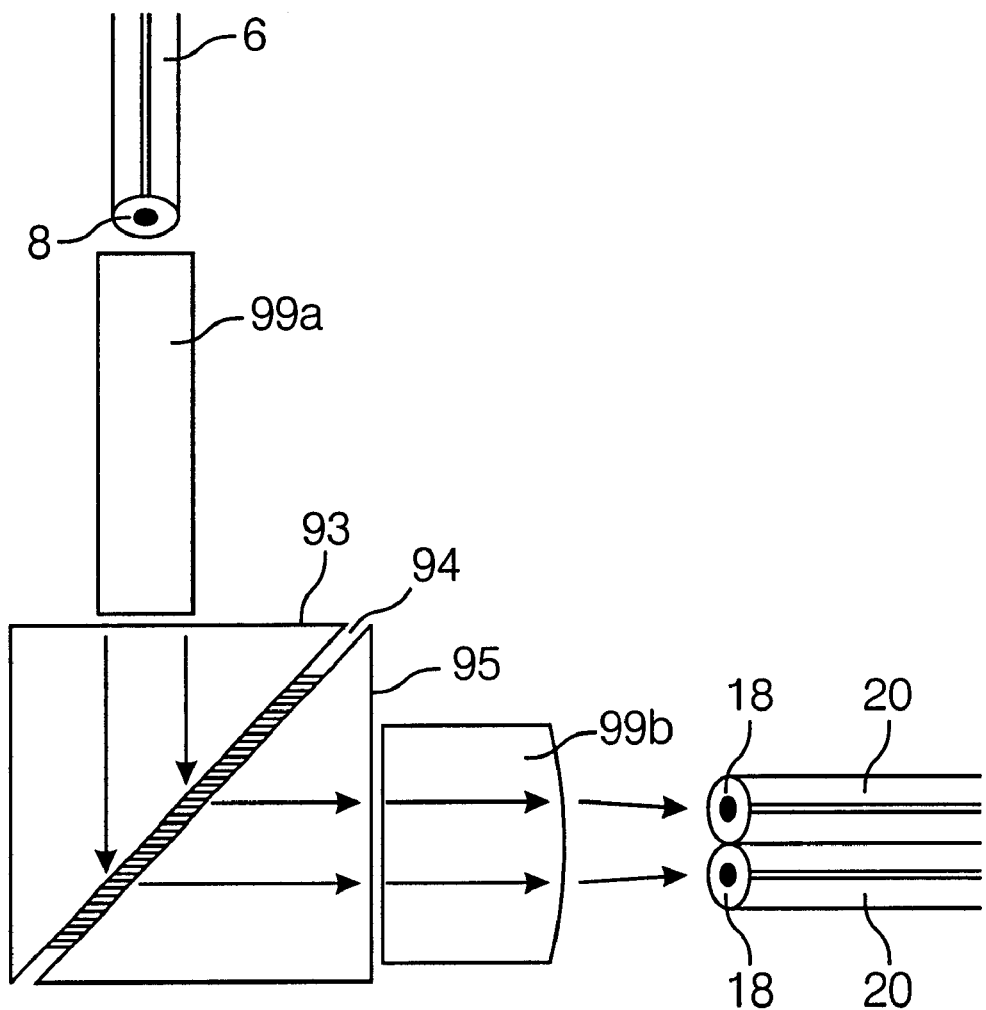
FIG. 6A illustrates a WDDM wherein the holographic element is coupled between two substrate prisms, and wherein a rigid construction is used such that each element of the WDDM is attached to another element, with no air space between the elements.

In a sixth embodiment, shown in FIGS. 6 and 6A, the essential difference from previous embodiments, such as FIGS. 1, is that the collimated beam is directed into the holographic optical element 94 after passing through a top part of the substrate that is formed as a right-angle prism having a beveled bottom portion 93, and then the spatially separated beams from the holographic optical element 94 are directed by the HOE 94 to a bottom part of the substrate that is formed as a second prism 95 having a beveled top portion. While the preferred embodiment utilizes 45-degree prisms, the prisms 93, 95 could be manufactured to allow the light to enter and/or leave the HOE 94 at any angle between 0 and 90 degrees. FIG. 6A illustrates that this embodiment may be implemented with a rigid construction, wherein a cylindrical first lens 99a and a cylindrical second lens 99b are used, and wherein each element is rigidly coupled to another element such that there is no intervening air space between elements.

Figure 7:
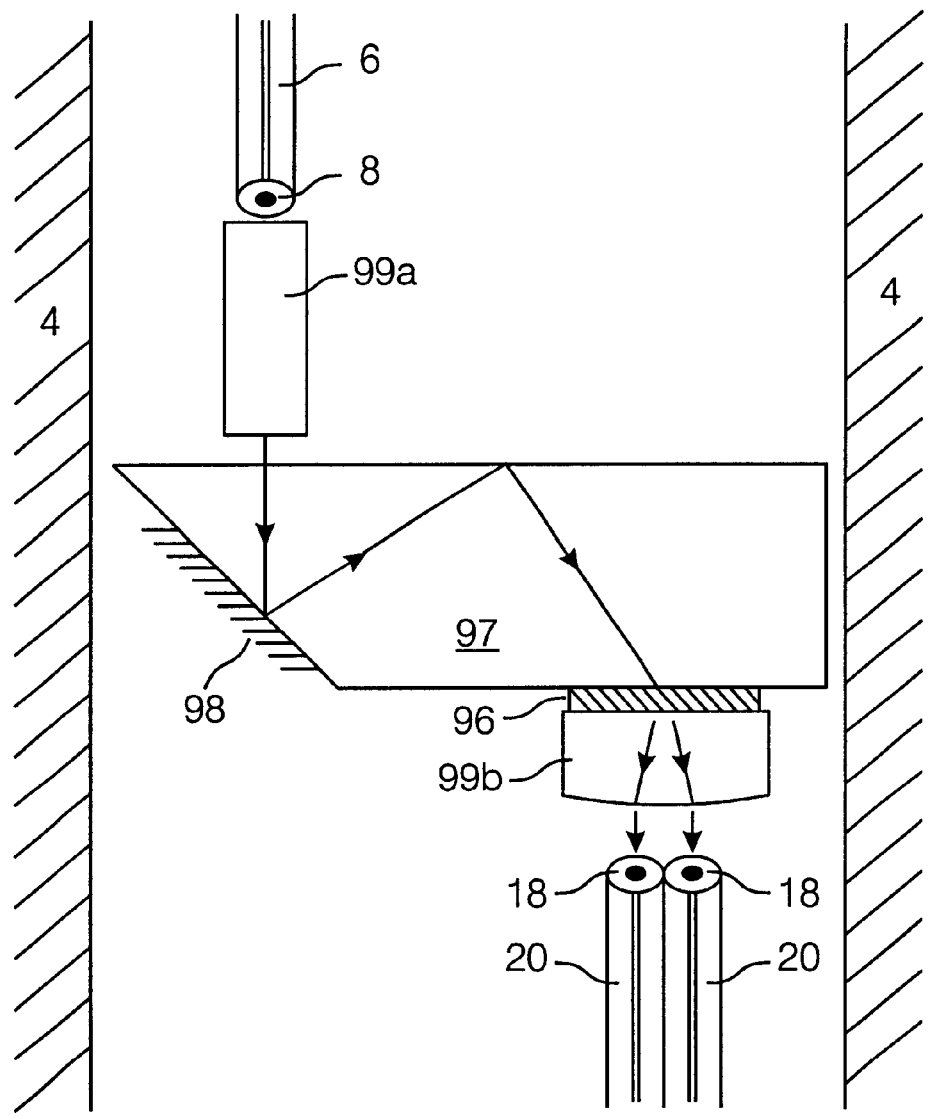
FIG. 7 illustrates a WDDM utilizing a cylindrical lens for the input coupler, a beveled and reflective substrate surface for two internal reflections, one dispersive element, and a cylindrical lens output focuser.

FIG. 7 illustrates another embodiment that is similar to the previous embodiments except that the light entering the HOE 96 passes through a substrate 97 with a beveled edge 98, to which a reflective mirror coating has been applied, so that total internal reflection within the substrate 97 is not necessary.

It should be apparent that many of these features can be permuted in order to obtain a whole class of devices which have the basic elements described above. Multispectral light from an input fiber can be collimated by a simple lens, cylindrical lens, compound lens, axial gradient index lens, radial gradient index lens, or by a diffractive optical element. This collimated beam, or in general, any collimated beam of light (from a laser cavity, for example) may then be dispersed by an optical element consisting of one or more holographically-produced transmission diffraction gratings. The diffracted beams are transported through a transparent substrate which also serves as the mount for the holographic optical element. Beam transport in the substrate may include one or several reflections, either by total internal reflection or by reflection from a reflective coating (metallic or multilayered dielectric). The beam may be coupled out of the substrate by simple transmission, by transmission through a curved surface for the purpose of focusing, or by means of a HOE placed in contact with the surface at the desired area of output. After passing through the output surface, the beams may be brought to a focus by any one of various types of lenses as was the case with the collimator, or by an array of lenses, either discrete or molded in a single slab of transparent material. The lens array would be used in the case of a holographic output coupler, as described in the second embodiment, discussed above.

The present invention relates to the transmission of optical signals, and more particularly to wavelength division multiplexers and demultiplexers for optical signals. One embodiment of the present invention comprises a wavelength division multiplexer device that includes a light input, a first lens, a holographic optical element, a light-transmissive substrate, a second lens, and two or more light outputs. The light input directs the input light beam toward the first lens, which in turn directs the input light beam towards the holographic optical element. The holographic optical element acts as a transmission diffraction grating and spatially separates the input light beam into two or more dispersed light beams. The light-transmissive substrate receives the dispersed light beams from the holographic optical element, and directs the beams to the second lens. Each light output receives one of the dispersed light beams from the second lens. Additionally, the substrate of the present invention further comprises a first edge and a second edge opposed to the first edge. The second edge comprises a beveled portion, which couples to a reflective surface. Moreover, the substrate further comprises a top part and a bottom part where the top part and the bottom part each comprise a first edge and a second edge. The second edge of the top part comprises a beveled portion, and the first edge of the bottom part comprises a beveled portion. The holographic optical element is disposed between the top part and the bottom part. Additionally, the elements of the present invention may be rigidly coupled to each other, without intervening air space, such that the light input is directly coupled to the first lens, the first lens is directly coupled to the holographic optical element, the holographic optical element is directly coupled to the substrate, the substrate is directly coupled to the second lens, and the light outputs are directly coupled to the second lens. Moreover, the elements of the present invention may be rigidly coupled to each other, without intervening air space, such that the light input is directly coupled to the first lens, the first lens is directly coupled to the top part of the substrate, the top part of the substrate is directly coupled to the holographic optical element, the holographic optical element is directly coupled to the bottom part of the substrate, the bottom part of the substrate is directly coupled to the second lens, and the second lens is directly coupled to the light outputs. Additionally, the second lens may be formed as an integral portion of the substrate. Finally, the holographic optical element further comprises two or more holographic optical elements that act as transmission gratings where the two or more holographic optical elements are stacked upon one another.

Another embodiment of the present invention comprises a wavelength division multiplexer device for use in an optical transmission system that includes a light input, a first lens, a light transmissive substrate, a holographic optical element, a second lens, and two or more light outputs. The light input directs an input light beams toward the first lens, which directs the input light beam toward a light-transmissive substrate. The holographic optical element receives the input light beam from the substrate, acting as a transmission diffraction grating, and spatially separates the input light beam into two or more dispersed light beams. The second lens receives the dispersed light beams from the holographic optical element. Each of the two or more light outputs receives one of the dispersed light beams from the second lens. Additionally, the substrate further comprises a first edge and a second edge opposed to the first edge. The second edge comprises a beveled portion where the beveled portion is coupled to a reflective surface. Additionally, the elements may be rigidly coupled to each other, without intervening air space, such that the light input is directly coupled to the first lens, the first lens is directly coupled to the substrate, the substrate is directly coupled to the holographic optical element, the holographic optic element is directly couple the second lens, and the second lens is directly coupled to the light outputs.

And another embodiment of the present invention comprises a wavelength division multiplexer device for use in an optical transmission system that includes a light input, a first lens, a first holographic optical element, a transparent substrate, a second holographic optical element, a plurality of output lenses, and two or more light outputs. The light input directs an input light beam toward a first lens, which directs the input light beam toward a first holographic optical element. The first holographic optical element acts as a transmission diffraction grating and spatially separates the input light beam into two or more dispersed light beams. The transparent substrate receives the dispersed light beams from the holographic optical element and directs the beams to the second holographic optical element, which diffracts the dispersed light beams. The plurality of output lenses receive the dispersed light beams from the second holographic optical element. Finally, each light output receives one of the dispersed light beams from the plurality of output lenses.

Other embodiments of the invention will be apparent to those skilled in the art after considering this specification or practicing the disclosed invention. For example, many of these features can be permuted in order to obtain an entire class of elements that have the basic elements described above. The specification and examples above are exemplary only, with the true scope of the invention being indicated by the following claims.

We claim the following invention:

1. A wavelength division multiplexer device for use in an optical transmission system, comprising:
    a light input that directs an input light beam toward a first lens, wherein said first lens directs said input light beam toward a holographic optical element that acts as a transmission diffraction grating, and wherein said holographic optical element spatially separates said input light beam into two or more dispersed light beams;
    a light-transmissive substrate that receives said dispersed light beams from said holographic optical element;
    a second lens that receives said dispersed light beams from said substrate; and
    two or more light outputs, each of which receives one of said dispersed light beams from said second lens.

2. The device of claim 1 wherein said substrate comprises a first edge and a second edge opposed to said first edge, said second edge comprising a beveled portion, wherein said beveled portion is coupled to a reflective surface.

3. The device of claim 1 wherein said substrate comprises a top part and a bottom part, wherein each of said top part and said bottom part comprises a first edge and a second edge, and wherein said second edge of said top part comprises a beveled portion, and wherein said first edge of said bottom part comprises a beveled portion, and wherein said holographic optical element is disposed between said top part and said bottom part.

4. The device of claim 1 wherein said elements are rigidly coupled to each other, without intervening air space, such that said light input is directly coupled to said first lens, said first lens is directly coupled to said holographic optical element, said holographic optical element is directly coupled to said substrate, said substrate is directly coupled to said second lens, and said light outputs are directly coupled to said second lens.

5. The device of claim 3 wherein said elements are rigidly coupled to each other, without intervening air space, such that said light input is directly coupled to said first lens, said first lens is directly coupled to said top part of said substrate, said top part of said substrate is directly coupled to said holographic optical element, said holographic optical element is directly coupled to said bottom part of said substrate, said bottom part of said substrate is directly coupled to said second lens, and said second lens is directly coupled to said light outputs.

6. The device of claim 1 wherein said second lens is formed as an integral portion of said substrate.

7. The device of claim 1 wherein said holographic optical element further comprises two or more holographic optical elements that act as transmission gratings, wherein said two or more holographic optical elements are stacked upon one another.

8. A wavelength division multiplexer device for use in an optical transmission system, comprising:
    a light input that directs an input light beams toward a first lens, wherein said first lens directs said input light beam toward a light-transmissive substrate;
    a holographic optical element that receives said input light beam from said substrate, wherein said holographic optical element acts as a transmission diffraction grating, said holographic optical element spatially separates said input light beam into two or more dispersed light beams;

a second lens that receives said dispersed light beams from said holographic optical element; and two or more light outputs, each of which receives one of said dispersed light beams from said second lens.

9. The device of claim 8 wherein:

said substrate comprises a first edge and a second edge opposed to said first edge, said second edge comprising a beveled portion, wherein said beveled portion is coupled to a reflective surface; and wherein said elements are rigidly coupled to each other, without intervening air space, such that said light input is directly coupled to said first lens, said first lens is directly coupled to said substrate, said substrate is directly coupled to said holographic optical element, said holographic optical element is directly coupled to said second lens, and said second lens is directly coupled to said light outputs.

10. A wavelength division multiplexer device for use in an optical transmission system, comprising:

a light input that directs an input light beam toward a first lens, wherein said first lens directs said input light beam toward a first holographic optical element that acts as a transmission diffraction grating, and wherein said first holographic optical element spatially separates said input light beam into two or more dispersed light beams;

a transparent substrate that receives said dispersed light beams from said first holographic optical element;

a second holographic optical element that receives and diffracts said dispersed light beams;

a plurality of output lenses that receives said dispersed light beams from said second holographic optical element; and two or more light outputs, each of which receives one of said dispersed light beams from said plurality of output lenses.

11. An optical transmission system that uses a wavelength division multiplexer, comprising:

a light input that directs an input light beam toward a first lens, wherein said first lens directs said input light beam toward a holographic optical element that acts as a transmission diffraction grating, and wherein said holographic optical element spatially separates said input light beam into two or more dispersed light beams;

a light-transmissive substrate that receives said dispersed light beams from said holographic optical element;

a second lens that receives said dispersed light beams from said substrate; and two or more light outputs, each of which receives one of said dispersed light beams from said second lens.

12. The system of claim 11 wherein said substrate comprises a first edge and a second edge opposed to said first edge, said second edge comprising a beveled portion, wherein said beveled portion is coupled to a reflective surface.

13. The system of claim 11 wherein said substrate comprises a top part and a bottom part, wherein each of said top part and said bottom part comprises a first edge and a second edge, and wherein said second edge of said top part comprises a beveled portion, and wherein said first edge of said bottom part comprises a beveled portion, and wherein said holographic optical element is disposed between said top part and said bottom part.

14. The system of claim 11 wherein said elements are rigidly coupled to each other, without intervening air space, such that said light input is directly coupled to said first lens, said first lens is directly coupled to said holographic optical element, said holographic optical element is directly coupled to said substrate, said substrate is directly coupled to said second lens, and said light outputs are directly coupled to said second lens.

15. The system of claim 13 wherein said elements are rigidly coupled to each other, without intervening air space, such that said light input is directly coupled to said first lens, said first lens is directly coupled to said top part of said substrate, said top part of said substrate is directly coupled to said holographic optical element, said holographic optical element is directly coupled to said bottom part of said substrate, said bottom part of said substrate is directly coupled to said second lens, and said second lens is directly coupled to said light outputs.

16. The system of claim 11 wherein said second lens is formed as an integral portion of said substrate.

17. The system of claim 11 wherein said holographic optical element further comprises two or more holographic optical elements that act as transmission gratings, wherein said two or more holographic optical elements are stacked upon one another.

18. An optical transmission system that uses a wavelength division multiplexer, comprising:

a light input that directs an input light beams toward a first lens, wherein said first lens directs said input light beam toward a light-transmissive substrate;

a holographic optical element that receives said input light beam from said substrate, wherein said holographic optical element acts as a transmission diffraction grating, said holographic optical element spatially separates said input light beam into two or more dispersed light beams;

a second lens that receives said dispersed light beams from said holographic optical element; and two or more light outputs, each of which receives one of said dispersed light beams from said second lens.

19. The system of claim 18 wherein:

said substrate comprises a first edge and a second edge opposed to said first edge, said second edge comprising a beveled portion, wherein said beveled portion is coupled to a reflective surface; and wherein said elements are rigidly coupled to each other, without intervening air space, such that said light input is directly coupled to said first lens, said first lens is directly coupled to said substrate, said substrate is directly coupled to said holographic optical element, said holographic optical element is directly coupled to said second lens, and said second lens is directly coupled to said light outputs.

20. An optical transmission system that uses a wavelength division multiplexer device, comprising:

a light input that directs an input light beam toward a first lens, wherein said first lens directs said input light beam toward a first holographic optical element that acts as a transmission diffraction grating, and wherein said first holographic optical element spatially separates said input light beam into two or more dispersed light beams;

a transparent substrate that receives said dispersed light beams from said first holographic optical element;

a second holographic optical element that receives and diffracts said dispersed light beams;

a plurality of output lenses that receives said dispersed light beams from said second holographic optical element; and two or more light outputs, each of which receives one of said dispersed light beams from said plurality of output lenses.

21. A method of manufacturing a wavelength division multiplexer device for use in an optical transmission system, comprising:

providing a first lens that receives a light input from an input light beam wherein said first lens directs said input light beam toward a holographic optical element that acts as a transmission diffraction grating, wherein said holographic optical element spatially separates said input light beam into two or more dispersed light beams;

optically coupling a light-transmissive substrate to holographic optical element, said light-transmissive substrate receives said dispersed light beams from said holographic optical element;

optically coupling a second lens to said light-transmissive substrate, said second lens receives said dispersed light beams from said substrate; and optically coupling two or more light outputs to said second lens, each of said light outputs receives one of said dispersed light beams from said second lens.

22. The method of claim 21 wherein said substrate comprises a first edge and a second edge opposed to said first edge, said second edge comprising a beveled portion, wherein said beveled portion is coupled to a reflective surface.

23. The method of claim 21 wherein said substrate comprises a top part and a bottom part, wherein each of said top part and said bottom part comprises a first edge and a second edge, and wherein said second edge of said top part comprises a beveled portion, and wherein said first edge of said bottom part comprises a beveled portion, and wherein said holographic optical element is disposed between said top part and said bottom part.

24. The method of claim 21 wherein said elements are rigidly coupled to each other, without intervening air space, such that said light input is directly coupled to said first lens, said first lens is directly coupled to said holographic optical element, said holographic optical element is directly coupled to said substrate, said substrate is directly coupled to said second lens, and said light outputs are directly coupled to said second lens.

25. The method of claim 23 wherein said elements are rigidly coupled to each other, without intervening air space, such that said light input is directly coupled to said first lens, said first lens is directly coupled to said top part of said substrate, said top part of said substrate is directly coupled to said holographic optical element, said holographic optical element is directly coupled to said bottom part of said substrate, said bottom part of said substrate is directly coupled to said second lens, and said second lens is directly coupled to said light outputs.

26. The method of claim 21 wherein said second lens is formed as an integral portion of said substrate.

27. The method of claim 21 wherein said holographic optical element further comprises two or more holographic optical elements that act as transmission gratings, wherein said two or more holographic optical elements are stacked upon one another.

28. A method of manufacturing a wavelength division multiplexer device for use in an optical transmission system, comprising:

providing a first lens that receives a light input from an input light beam wherein said first lens directs said input light beam toward a light-transmissive substrate;

optically coupling a holographic optical element to said light-transmissive substrate, said holographic optical element receives said input light beam from said substrate, said holographic optical element acts as a transmission diffraction grating, said holographic optical element spatially separates said input light beam into two or more dispersed light beams;

optically coupling a second lens to said holographic optical element, said second lens receives said dispersed light beams from said holographic optical element; and optically coupling two or more light outputs to said second lens, each of said light outputs receives one of said dispersed light beams from said second lens.

29. The method of claim 28 wherein:

said substrate comprises a first edge and a second edge opposed to said first edge, said second edge comprising a beveled portion, wherein said beveled portion is coupled to a reflective surface; and wherein said elements are rigidly coupled to each other, without intervening air space, such that said light input is directly coupled to said first lens, said first lens is directly coupled to said substrate, said substrate is directly coupled to said holographic optical element, said holographic optical element is directly coupled to said second lens, and said second lens is directly coupled to said light outputs.

30. A method of manufacturing a wavelength division multiplexer device for use in an optical transmission system, comprising:

providing a first lens that receives a light input from an input light beam wherein said first lens directs said input light beam toward a first holographic optical element that acts as a transmission diffraction grating, and wherein said first holographic optical element spatially separates said input light beam into two or more dispersed light beams;

optically coupling a transparent substrate to said first holographic optical element, said transparent substrate receives said dispersed light beams from said first holographic optical element;

optically coupling a second holographic optical element to said first holographic optical element, said second holographic optical element receives and diffracts said dispersed light beams;

optically coupling a plurality of output lenses to said second holographic optical element, said output lenses receives said dispersed light beams from said second holographic optical element; and optically coupling two or more light outputs to said output lenses, each of said light outputs receives one of said dispersed light beams from said plurality of output lenses.

31. A method that uses a wavelength division multiplexer device in an optical transmission system, comprising:

providing a light input that directs an input light beam toward a first lens wherein said first lens directs said input light beam toward a holographic optical element that acts as a transmission diffraction grating, and wherein said holographic optical element spatially separates said input light beam into two or more dispersed light beams;

transmitting said dispersed light beams towards a light-transmissive substrate from said holographic optical element;

receiving said dispersed light beams from said substrate into a second lens; and receiving into two or more light outputs said dispersed light beams wherein each of said light outputs receives one of said dispersed light beams from said second lens.

32. The method of claim 31 wherein said substrate comprises a first edge and a second edge opposed to said first edge, said second edge comprising a beveled portion, wherein said beveled portion is coupled to a reflective surface.

33. The method of claim 31 wherein said substrate comprises a top part and a bottom part, wherein each of said top part and said bottom part comprises a first edge and a second edge, and wherein said second edge of said top part comprises a beveled portion, and wherein said first edge of said bottom part comprises a beveled portion, and wherein said holographic optical element is disposed between said top part and said bottom part.

34. The method of claim 31 wherein said elements are rigidly coupled to each other, without intervening air space, such that said light input is directly coupled to said first lens, said first lens is directly coupled to said holographic optical element, said holographic optical element is directly coupled to said substrate, said substrate is directly coupled to said second lens, and said light outputs are directly coupled to said second lens.

35. The method of claim 33 wherein said elements are rigidly coupled to each other, without intervening air space, such that said light input is directly coupled to said first lens, said first lens is directly coupled to said top part of said substrate, said top part of said substrate is directly coupled to said holographic optical element, said holographic optical element is directly coupled to said bottom part of said substrate, said bottom part of said substrate is directly coupled to said second lens, and said second lens is directly coupled to said light outputs.

36. The method of claim 31 wherein said second lens is formed as an integral portion of said substrate.

37. The method of claim 31 wherein said holographic optical element further comprises two or more holographic optical elements that act as transmission gratings, wherein said two or more holographic optical elements are stacked upon one another.

38. A method that uses a wavelength division multiplexer device in an optical transmission system, comprising:

providing a light input that directs an input light beams toward a first lens wherein said first lens directs said input light beam toward a light-transmissive substrate;

transmitting said input light beam from said light-transmissive substrate to a holographic optical element wherein said holographic optical element acts as a transmission diffraction grating; and wherein said holographic optical element spatially separates said input light beam into two or more dispersed light beams;

receiving said dispersed light beams into a second lens that receives from said holographic optical element; and receiving into two or more light outputs said dispersed light beams wherein each of said light outputs receives one of said dispersed light beams from said second lens.

39. The method of claim 38 wherein:

said substrate comprises a first edge and a second edge opposed to said first edge, said second edge comprising a beveled portion, wherein said beveled portion is coupled to a reflective surface; and wherein said elements are rigidly coupled to each other, without intervening air space, such that said light input is directly coupled to said first lens, said first lens is directly coupled to said substrate, said substrate is directly coupled to said holographic optical element, said holographic optical element is directly coupled to said second lens, and said second lens is directly coupled to said light outputs.

40. A method that uses a wavelength division multiplexer device in an optical transmission system, comprising:

providing a light input that directs an input light beam toward a first lens wherein said first lens directs said input light beam toward a first holographic optical element that acts as a transmission diffraction grating, and wherein said first holographic optical element spatially separates said input light beam into two or more dispersed light beams;

transmitting said dispersed light beams towards a transparent substrate from said first holographic optical element;

transmitting said dispersed light beams from said first holographic optical element to a second holographic optical element that receives and diffracts said dispersed light beams;

receiving said dispersed light beams from said second holographic optical element in to a plurality of output lenses; and receiving into two or more light outputs said dispersed light beams wherein each of said light outputs receives one of said dispersed light beams from said plurality of output lenses.

* * * * *